(12) United States Patent
Fevre

(10) Patent No.: US 8,777,267 B2
(45) Date of Patent: Jul. 15, 2014

(54) DEVICE FOR ADJUSTING THE POSITION OF A STEERING COLUMN IN AN AUTOMOBILE

(75) Inventor: Laurent Fevre, Saint Sulpice de Pommeray (FR)

(73) Assignee: ZF Systemes de Direction Nacam, S.A.S., Vendome (FR)

( * ) Notice: Subject to any disclaimer, the term of this patent is extended or adjusted under 35 U.S.C. 154(b) by 255 days.

(21) Appl. No.: 12/992,504

(22) PCT Filed: May 16, 2008

(86) PCT No.: PCT/FR2008/050852
§ 371 (c)(1),
(2), (4) Date: Nov. 12, 2010

(87) PCT Pub. No.: WO2009/138578
PCT Pub. Date: Nov. 19, 2009

(65) Prior Publication Data
US 2011/0259140 A1    Oct. 27, 2011

(51) Int. Cl.
*B62D 1/16* (2006.01)
*B62D 1/184* (2006.01)
(52) U.S. Cl.
CPC .................................... *B62D 1/184* (2013.01)
USPC ............................................. 280/779; 74/473
(58) Field of Classification Search
USPC ............ 74/492, 493, 494, 495; 280/775, 779
See application file for complete search history.

(56) References Cited

U.S. PATENT DOCUMENTS

| 5,992,263 | A  | * | 11/1999 | Bleuel et al. ..................... 74/493 |
| 7,083,197 | B2 | * | 8/2006  | Lutz .............................. 280/775 |
| 2002/0131820 | A1 | * | 9/2002  | Daniel et al. .................. 403/316 |
| 2003/0172765 | A1 | * | 9/2003  | Heiml ............................. 74/493 |
| 2004/0000781 | A1 | * | 1/2004  | Lange et al. .................. 280/777 |
| 2004/0134302 | A1 | * | 7/2004  | Ko et al. ......................... 74/493 |
| 2004/0159173 | A1 | * | 8/2004  | Sawada ........................... 74/492 |
| 2005/0035584 | A1 | * | 2/2005  | Camp et al. .................. 280/775 |
| 2005/0097978 | A1 | * | 5/2005  | Ben Rhouma et al. ......... 74/492 |
| 2005/0104353 | A1 | * | 5/2005  | Ikeda et al. .................. 280/775 |

(Continued)

FOREIGN PATENT DOCUMENTS

EP    1 359 082 A1    11/2003

OTHER PUBLICATIONS

International Search Report and Written Opinion completed Jan. 21, 2009 and mailed Jan. 30, 2009 from corresponding International Application No. PCT/FR2008/050852 (13 pages).
International Preliminary Search Report completed Dec. 6, 2010 and mailed Dec. 16, 2010 from corresponding International Application No. PCT/FR2008/050852 (2 pages).

(Continued)

*Primary Examiner* — Troy Chambers
*Assistant Examiner* — Alexander Vu
(74) *Attorney, Agent, or Firm* — Klein, O'Neill & Singh, LLP

(57) ABSTRACT

According to the disclosure, the steering column comprises a steering shaft rotatingly mounted in a tube-body provided on a side mount of a fixed bearing assembly via a lateral mechanism. The column can be adjusted in height and/or depth by an axis clamping system with a clamping rod (interacting with the lateral mechanism. The lateral mechanism comprises a bearing member provided between the side mount and a side member of the tube-body. A cross-section arranged between the bearing member and the side member enables counter-rotation. The lateral mechanism includes a system for adjusting the sliding clearance on the clamping rod using a bearing member and an adjustable clamping head.

13 Claims, 5 Drawing Sheets

(56) References Cited

U.S. PATENT DOCUMENTS

2006/0156854 A1* 7/2006 Sawada et al. .................. 74/493
2006/0170204 A1* 8/2006 Higashino et al. ............ 280/775
2006/0191368 A1* 8/2006 Sawada et al. .................. 74/495
2006/0267328 A1* 11/2006 Eggers et al. ................. 280/775
2011/0259140 A1* 10/2011 Fevre .............................. 74/493

OTHER PUBLICATIONS

International Written Opinion completed Dec. 6, 2010 and mailed Dec. 16, 2010 from corresponding International Application No. PCT/FR2008/050852 (4 pages).

* cited by examiner

DEVICE FOR ADJUSTING THE POSITION OF A STEERING COLUMN IN AN AUTOMOBILE

CROSS-REFERENCE TO RELATED APPLICATION(S)

The present application is based on, and claims priority from, PCT International Application No. PCT/FR2008/050852, filed May 16, 2008; the contents of which are hereby expressly incorporated herein by reference.

BACKGROUND

The present invention relates to a device for adjusting the position of an adjustable steering column of an automobile according to the preamble of claim 1 known from EP A 0836981. The device according to the invention applies to a steering column being adjustable in depth or in tilt or to a steering column being adjustable in depth and in tilt. The steering column comprises a steering shaft, mounted in a tube-body and bearing the steering wheel; said tube-body being supported and clamped on the structure of the vehicle in the desired position.

The different known types of steering column adjustable in position comprise a clamping system with two positions: one locked position and one unlocked position. In the locked position, the steering column is clamped in position, and in the unlocked position, the steering column is unclamped so as to be able to carry out the desired position adjustment of said column.

In the unlocked position, there should be an operating clearance sufficient for enabling the correct sliding of the steering column with respect to the structure of the vehicle. The known steering columns then have one of the two hereinafter mentioned types of drawbacks: either the operating clearance is too low, and the operations for adjusting the steering wheel are difficult to be performed by the driver; or the operating clearance is too large, and there occurs an apparent tipping of the steering wheel, being badly experienced and worrying for the driver.

SUMMARY

It is an object of the present invention to provide a device for adjusting the position of an adjustable steering column of an automobile, overcoming the above-described drawbacks. The adjusting device according to the invention will enable to obtain an operating clearance being mastered between the steering column and the structure of the vehicle upon the adjustment, while being perfectly reliable regarding the position holding, when the clamping system of the column is in the locked position, as disclosed in EP A-1,359,082 in the name of the Applicant NACAM.

Moreover, the position adjusting device will have to be easily integrated into the existing steering column bulk.

According to an embodiment, the invention relates to a device for adjusting the position of a steering column of an automobile, consisting in a steering shaft rotatingly mounted around a steering axis in a tube-body. Said tube-body is connected to a support assembly being fastened to the structure of the vehicle. Said steering column is adjustable in height and/or in depth, by a clamping system according to a clamping axis, being substantially perpendicular to the vertical plane crossing the steering axis.

The link assembly between said tube-body and the support assembly consists in a lateral mechanism, with respect to the vertical plane of the steering axis, mounted on a side post of the support assembly. Said lateral mechanism comprises an anti-rotation system according to the clamping axis, and an anti-rotation system according to the steering axis. Both anti-rotation systems enable to obtain a link of the embedded type between the tube-body and the side post of the support assembly, when the clamping system is in the locked position.

The lateral mechanism further comprises a system for adjusting the sliding clearance according to the steering axis between the lateral mechanism and the tube-body so as to avoid any apparent tipping, when the clamping system is in the unlocked position; said clearance adjusting system being integrated into said clamping system, and being controlled by the clamping system.

Advantageously according to the invention, the anti-rotation system according to the clamping axis and the anti-rotation system according to the steering axis are one single anti-rotation system consisting in a bearing member cooperating with the tube-body. Said bearing member has a cross-sectional profile with respect to the steering axis cooperating with a conjugated profile being provided on said tube-body, the bearing member being arranged between the tube-body and the side post, and the bearing member being connected to said side post.

In such an embodiment of this invention, a particularly interesting embodiment consists in that the bearing member comprises two bearing sides being tilted one with respect to the other, being parallel to the steering axis, and being arranged on one side of a clamping plane crossing the clamping axis and perpendicular to the vertical plane of the steering axis. Said bearing sides respectively cooperate with two contact sides having a conjugated profile, being arranged on the tube-body, said contact sides having the same tilt with respect to the vertical plane of the steering axis as said bearing sides, and being parallel to said steering axis.

According to an embodiment of the invention, the clamping system comprises:
- a clamping rod the axis of which is the clamping axis, all the other members of the clamping system are mounted on said clamping rod crossing the tube-body, the bearing member, the side post as well as all the other members;
- a clamping assembly, being arranged against the external side of the side post;
- an operating system rotatingly driving the clamping assembly with respect to the clamping axis;
- a clamping square, being arranged on the internal end of the clamping rod so as to make a clamping head, coming against the internal side of the tube-body;
- a clamping member, being arranged on the external end of the clamping rod so as to clamp, in the direction of the clamping axis, the tube-body on the side post, when the clamping system is in the locked position.

According to the invention, the sliding clearance adjusting system cooperates with the clamping assembly, enabling to use the clamping system bulk.

In this embodiment;
- the clamping assembly comprises a cam being fixed in rotation with respect to the clamping axis, and a cam being mobile in rotation with respect to the clamping axis and integral with the operating lever or spherical ended needles abutting between a fixed plate and a mobile plate;
- the sliding clearance adjusting system comprises an adjustment member mounted on the clamping rod, said adjustment member being operable so as to adjust its axial position with respect to the side post, so that, in an unlocked position of the clamping system, there is the desired clearance between each one of both hearing sides of the bearing member and the corresponding contact side of the tube-body.

In this structure of the invention:

the tube-body comprises a side member comprising two tilted portions and a substantially vertical connecting portion, each tilted portion comprises an external side being the corresponding contact side, and the connecting portion is provided with a clamping rod crossing oblong hole, being parallel to the steering axis;

the bearing member comprises two substantially vertical bearing portions coming against the side post, and two tilted portions comprising an internal side being the corresponding bearing side, the bearing member having a clamping rod crossing hole;

the side post comprises a clamping rod crossing oblong hole, being substantially perpendicular to the clamping plane;

the clamping square forming the clamping head has two tilted sides, coming against the internal sides of the corresponding tilted portions of the tube-body for enabling the clamping in the locked position.

In this structure of the invention:

the clamping rod comprises an integrated ring making up the adjustment member;

the clamping rod has an internal threaded end receiving a nut making up the clamping head;

the clamping rod has an external threaded end with an operating shape arranged on the very end, said form enabling the adjustment of the clamping head with respect to said ring in the unlocked position, the external threaded end receives the clamping member which consists in a clamping nut clamped in the locked position.

The position adjusting device for a steering column according to the invention is thus advantageous in that it overcomes any phenomenon of apparent tipping of the steering wheel, when the clamping system is in the unlocked position. The device of the invention also has the advantage of having a link of the embedded type between the tube-body and the side post of the support assembly connected to the structure of the vehicle, when the clamping system is in the locked position. Moreover, the sliding clearance adjusting system cooperates with the clamping assembly, using the clamping system bulk being advantageous in that any additional bulk is avoided.

BRIEF DESCRIPTION OF THE FIGURES

Additional characteristics and advantages of the present invention shall become easily apparent from the description that follows of several preferred embodiments of this invention with reference to the corresponding accompanying drawings, wherein.

DETAILED DESCRIPTION

Figure 1:
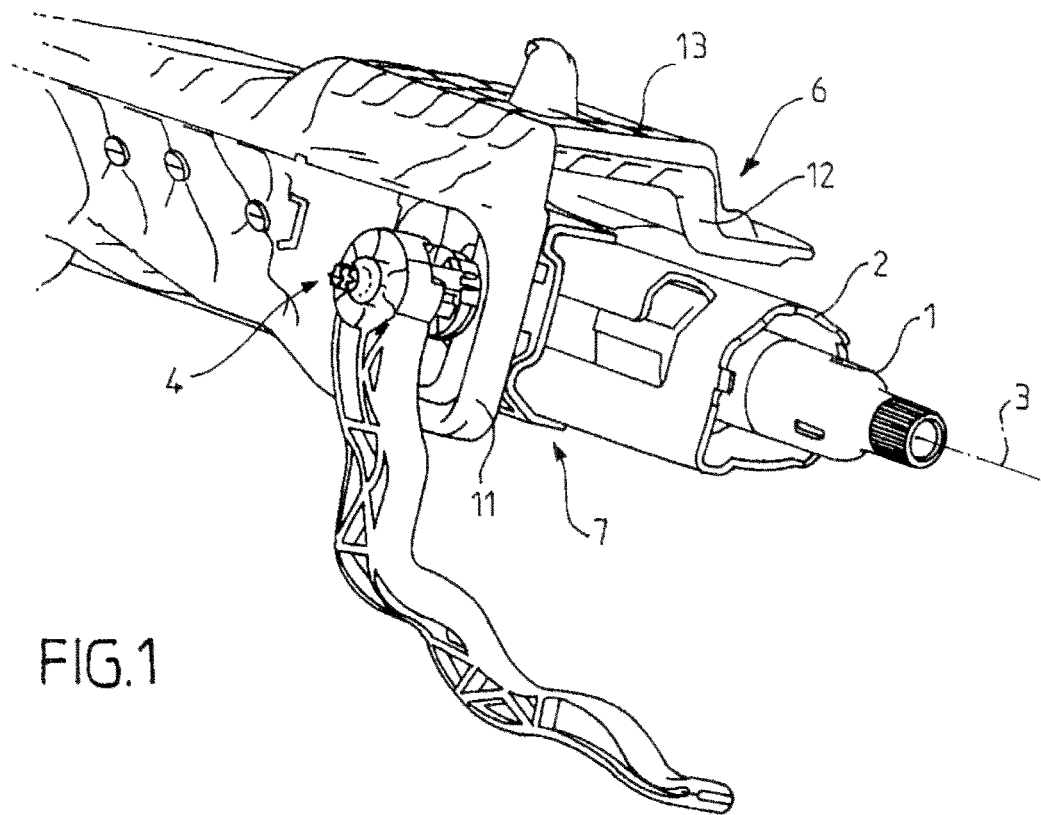
FIG. 1 is a perspective view of the position adjusting device for a steering column according to the invention.

As can be seen on the figures, the invention relates to a position adjusting device for an adjustable steering column of an automobile. The steering column comprises a steering shaft 1, rotatingly mounted around a steering axis 3. The steering shaft 1 is rotatingly mounted in a tube-body 2. Said tube-body 2 is arranged between two side posts 11 and 12, being connected by a connecting member 13. Both side posts 11, 12 and the connecting member 13 make up a bearing member, being part of a bearing assembly 6. The hearing assembly 6 is fixed to the structure of the vehicle. The steering column is adjustable in tilt or in depth, or in tilt and in depth.

The tube-body 2 is connected to the bearing assembly 6 by a position adjusting system either in height or in depth or in height and in depth.

The steering column comprises a clamping system 4, enabling to have the locked position and the unlocked position of said steering column.

The clamping system 4 is arranged and acts according to a clamping axis 5, being substantially perpendicular to the vertical plane 8 crossing the steering axis 3.

Both side posts 11 and 12 of the bearing assembly 6 are substantially vertical, that is they are substantially parallel to the vertical plane 8 crossing the steering axis 3.

In the remainder of the description and for a same member, internal or inner with respect to the steering axis 3 or with respect to the vertical plane 8, will refer to what is the closest to this steering axis 3 or to this vertical plane 8, and external or outer what is the most remote therefrom.

Thus, the side post 11 has an internal side 15 and an external side 17 with respect to the steering axis 3, or with respect to the vertical plane 8. The internal side 15 and the external side 17 are substantially parallel to the vertical plane 8.

In addition, the post 11 has an oblong hole 9 being oriented in the direction of the in-height adjustment of the position adjusting system.

The position adjusting device is clamped in the position being selected by the clamping system 4. The clamping axis 5 is also substantially perpendicular to the side post 11 of the bearing assembly 6. The clamping device has two positions: one unlocked position wherein the clamping device is unclamped for enabling the desired adjustment of the steering column, and one locked position wherein the clamping device is clamped for ensuring that the desired position is held.

In the embodiments of this invention shown on the different figures, the clamping axis 5 crosses the tube-body 2 in the vicinity of the steering axis 3. The plane, crossing the clamping axis 5 and the steering axis 3, is referred to as the clamping plane 9; such a clamping plane 9 is substantially perpendicular to the vertical plane 8.

As can be seen on the figures, all the links between said tube-body 2 and the bearing assembly 6 are made up by a lateral mechanism 7 with respect to the vertical plane 8 of the steering axis 3, that is it arranged fully on one single side of the vertical plane 8.

The lateral mechanism 7 is thus mounted on the side post 11 of the bearing assembly 6.

According to the invention, the lateral mechanism 7 comprises anti-rotation systems so as to ensure the clamping in the locked position, and a system for adjusting the sliding clearance in the unlocked position.

An anti-rotation system is arranged according to the clamping axis 4, and an anti-rotation system is arranged according to the steering axis 3. Both anti-rotation systems enable to obtain a link of the embedded type between the tube-body 2 and the side post 11 of the hearing assembly 6, when the clamping system 4 is in the locked position.

The sliding clearance adjusting system is achieved according to the steering axis 3 between the lateral mechanism 7 and the tube-body 2 so as to avoid any apparent tipping, when the clamping system 4 is in the unlocked position. Moreover, the clearance adjusting system is integrated into said clamping system 4, by means of a clamping rod 160 controlling said sliding clearance adjusting system.

The anti-rotation system according to the clamping axis 5 and the anti-rotation system according to the steering axis 3 are one single and same anti-rotation system. Said single anti-rotation system is made up of a bearing member 40 cooperating with the tube-body 2. Such a bearing member 40 has a cross-section profile with respect to the steering axis 3 cooperating with a conjugated profile being arranged on said tube-body 2. The bearing member 40 is arranged between the tube-body 2 and the internal side 15 of the side post 11. Additionally, the bearing member 40 is connected to said side post 11.

As is shown on FIGS. 3, 4, 7 to 10, the tube-body 2 comprises one side member 21 and one side member 22, being arranged approximately on both sides of the vertical plane 8.

In a cross-section plane with respect to the steering axis 3, the side member 22 has a substantially semi-circular shape, and the side member 21 has a shape made up of several straight parts.

The side member 21 comprises two tilted portions 23 and 24 arranged on one side of the clamping plane 9, and a substantially vertical connecting portion 27 connected to the portion 23. The two tilted portions 23 and 24 are arranged symmetrically with respect to a plane parallel to the clamping plane 9. Each tilted portion 24 and connecting portion 27 are respectively extended by an end portion 26 and 25 to be connected to the side member 22 by a member perpendicular to the vertical plane 8.

The connecting portion 27 is provided with a clamping system 4 crossing oblong hole 28, being parallel to the steering axis 3, enabling the in-depth adjustment of the position adjusting system. The tilted portion 23 has an internal side 29 and an external contact side 33, being parallel to the steering axis 3. The tilted portion 24 has an internal side 30 and an external contact side 34, being also parallel to the steering axis 3. The connecting portion 27 has an internal side 31 and an external side 35, also being parallel to the steering axis 3.

The bearing member 40 comprises two substantially vertical bearing portions 41 arranged on opposite sides of the clamping plane 9. One of the bearing portions 41 comprises two tilted portions 43 and 44 arranged symmetrically with respect to a plane parallel to the clamping plane 9. The tilted portion 43 is connected to the other bearing portion 41 by a substantially vertical connecting portion 45, the tilted portion 44 and the other bearing portion 41 are respectively extended by an end portion 46 substantially perpendicular to the vertical plane 8. The connecting portion 45 is provided with a clamping system crossing hole 49.

The bearing portion 41 is provided with a clamping system 4 crossing hole 49. Each bearing portion 41 has a substantially vertical external side 42, coming against the internal side 15 of the side post 11. The tilted portion 43 has an internal bearing side 47, being parallel to the steering axis 3. The tilted portion 44 has an internal bearing side 48, being parallel to the steering axis 3.

The clamping system 4 enables to mount the tube-body 2 against the bearing member 40 to come against the side post 11. The external contact side 33 and the internal bearing side 47 are arranged with the same tilt with respect to the clamping plane 9, as well as the external contact side 34 and the internal bearing side 48 being symmetrical therewith with respect to the parallel plane of the clamping plane 9.

Thus, the bearing member 40 comprises two internal bearing sides 47, 48 being tilted one with respect to the other, being parallel to the steering axis 3, and being arranged on both sides of a plane parallel to the clamping plane 9 crossing the clamping axis 5 and the steering axis 3 and perpendicular to the vertical plane 8 of the steering axis 3. Said internal bearing sides 47, 48 cooperate respectively with two external contact sides 33, 34 having a conjugated profile, being provided on the tube-body 2, said external contact sides 33, 34 have the same tilt with respect to the vertical plane 8 of the steering axis 3 as said internal bearing sides 47, 48, and are parallel to said steering axis 3.

Such an architecture of the device of the invention enables the external contact sides 33 and 34 of the tube-body 2 to perfectly come against the internal bearing sides 47 and 48 of the bearing member 40, when the clamping system is in the clamped position. As such different sides are straight and tilted with respect to a plane parallel to the clamping plane 9, they prevent any rotation of the tube-body 2 with respect to the clamping axis 5 and with respect to the steering axis 3.

Moreover, the anti-rotation system is completed by the connecting portions 27 and 45 coming one against the other in a locked position, on the other side of the tilted portions with respect to the clamping plane 9.

A first embodiment of the clamping system 4 is shown on FIGS. 1 and 3 to 6, and comprises a clamping rod 160, the axis of which is the clamping axis 4.

Figure 7:
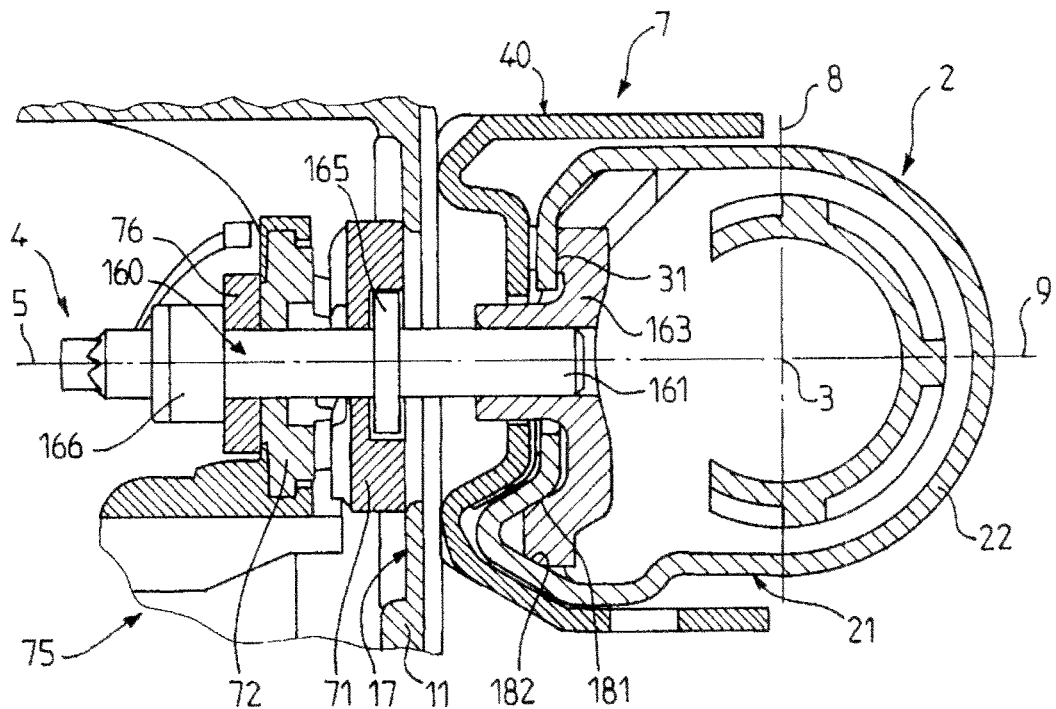
FIG. 7 is a view similar to FIG. 3 in the locked position of another embodiment.
Figure 8:
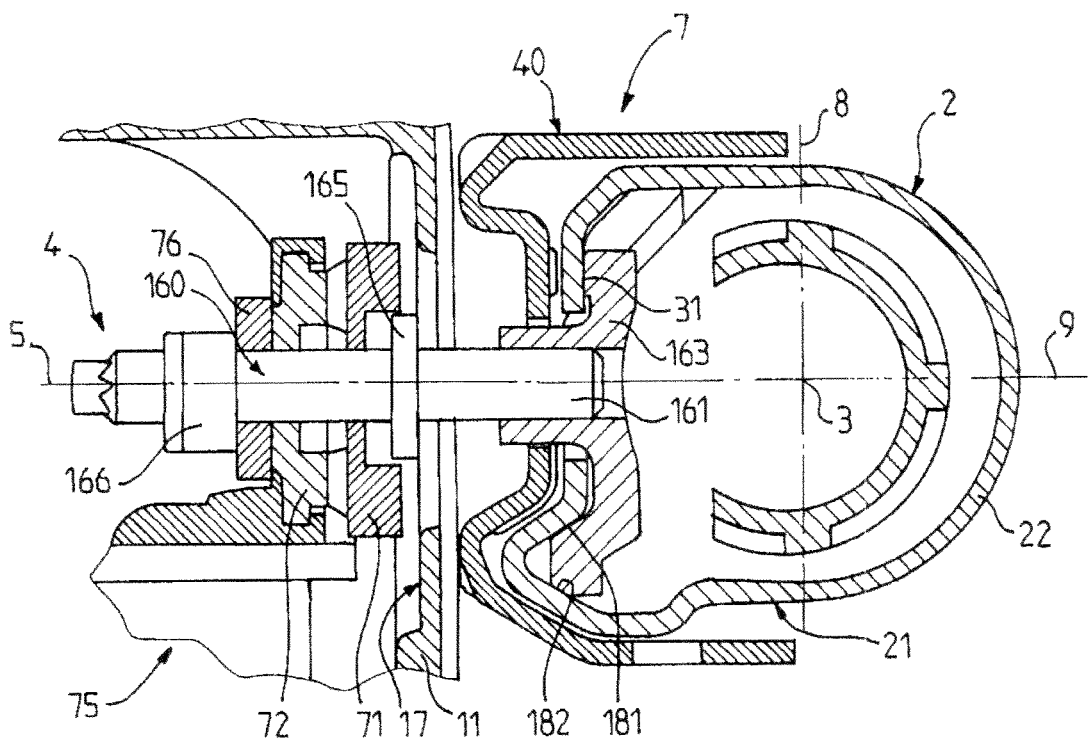
FIG. 8 is a view similar to FIG. 7 in the unlocked position.

A second embodiment of the clamping system 4 is shown on FIGS. 7 and 8 and comprises a clamping rod 160, the axis of which is the clamping axis 4.

Figure 2:
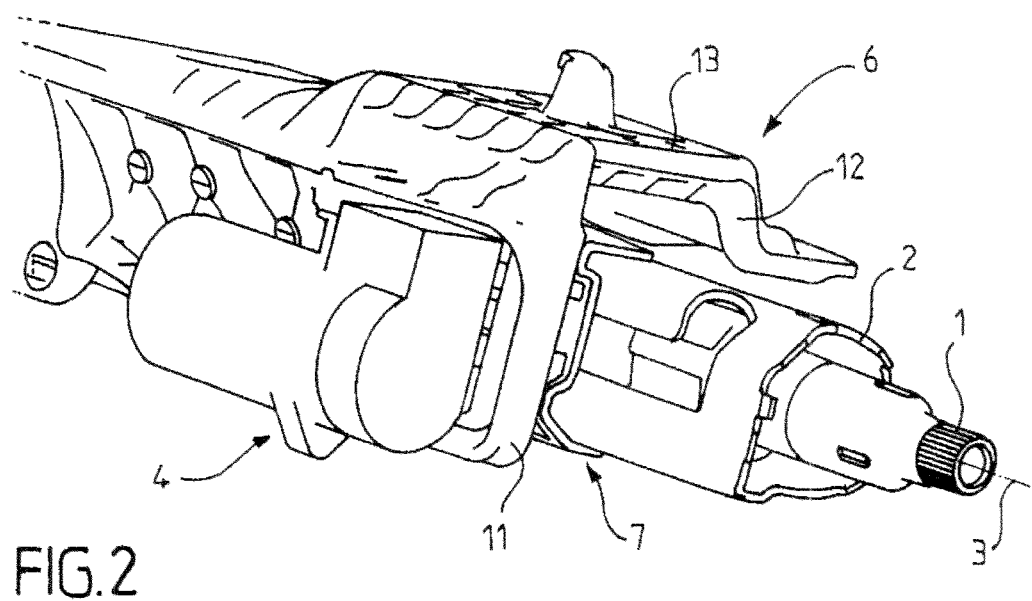
FIG. 2 is a view similar to FIG. 1 of another embodiment of the invention.
Figure 3:
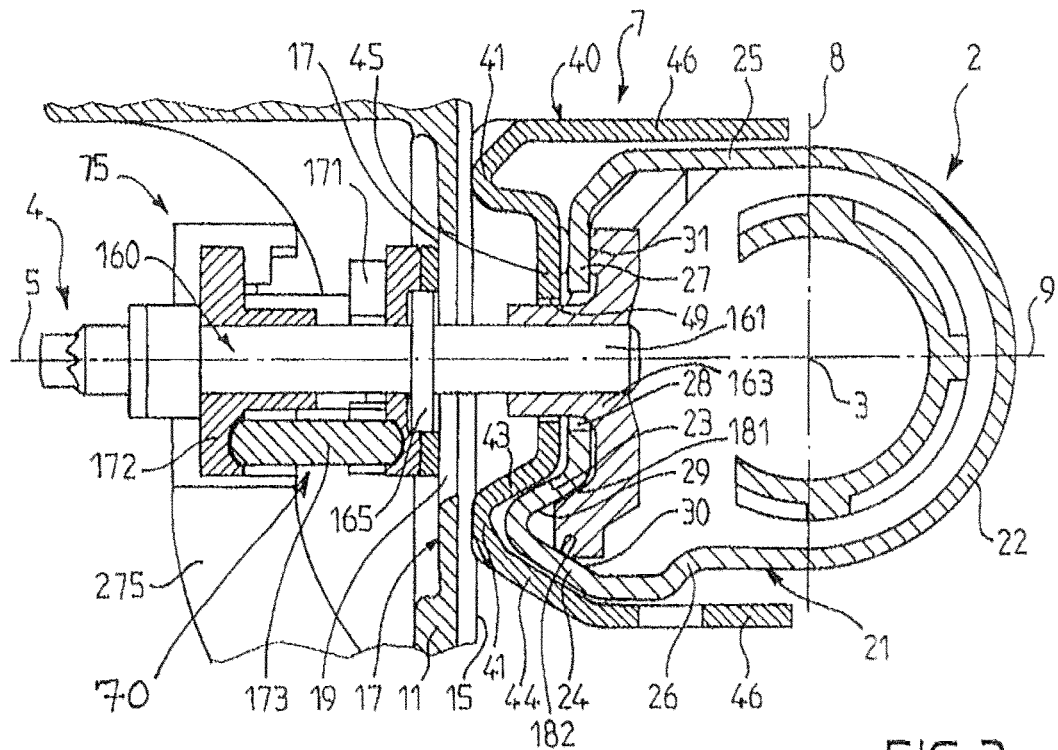
FIG. 3 is a cross-section view through the clamping axis of FIG. 1 in a locked position.
Figure 4:
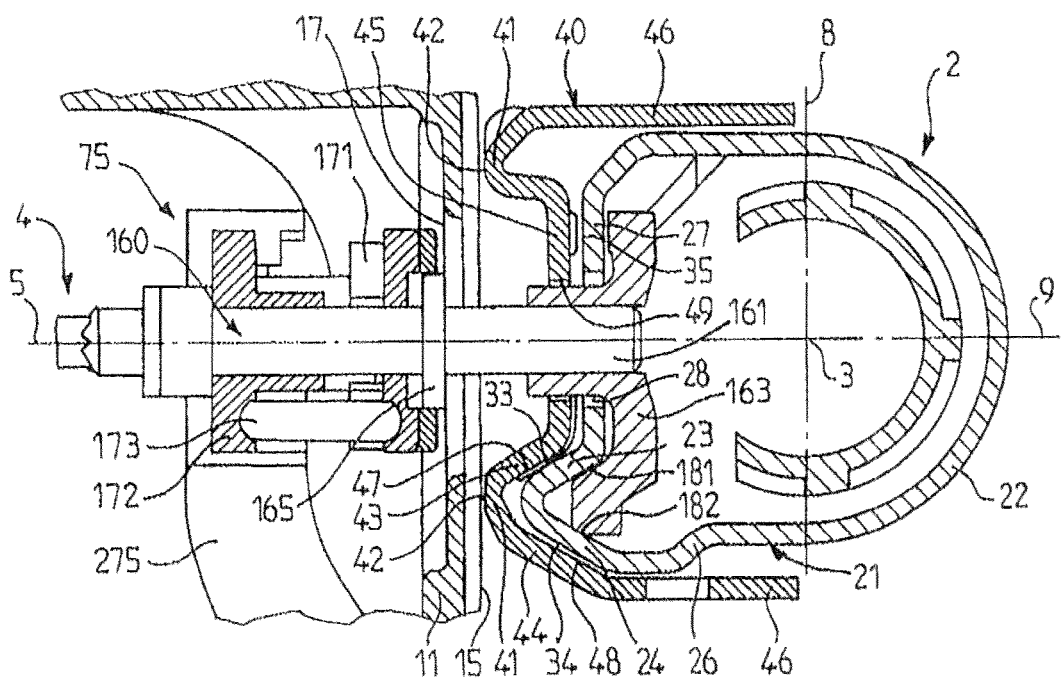
FIG. 4 is a cross-section view similar to FIG. 3 in the unlocked position.
Figure 5:
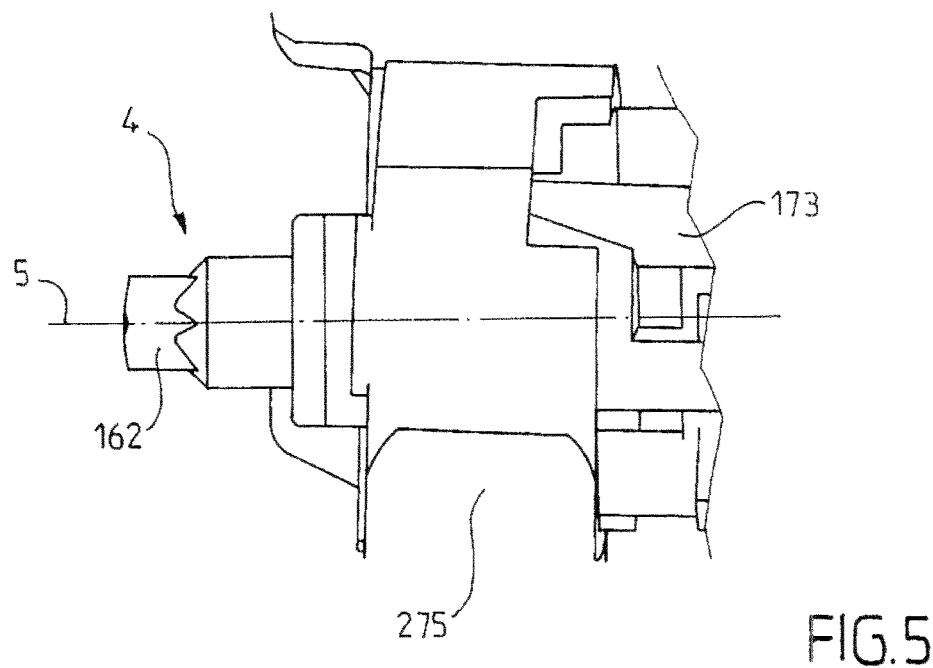
FIG. 5 is a detailed view of FIG. 3.
Figure 6:
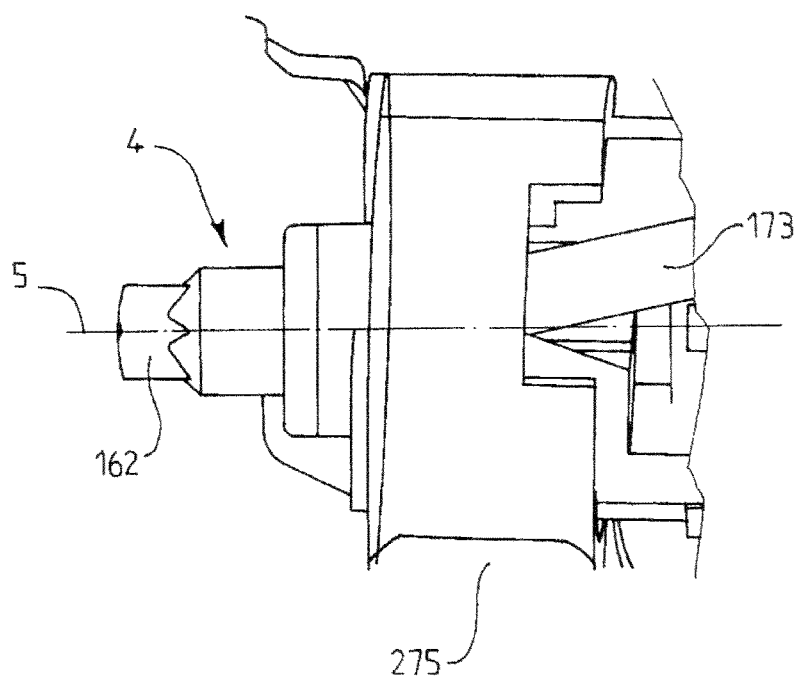
FIG. 6 is a detailed view of FIG. 4.
Figure 9:
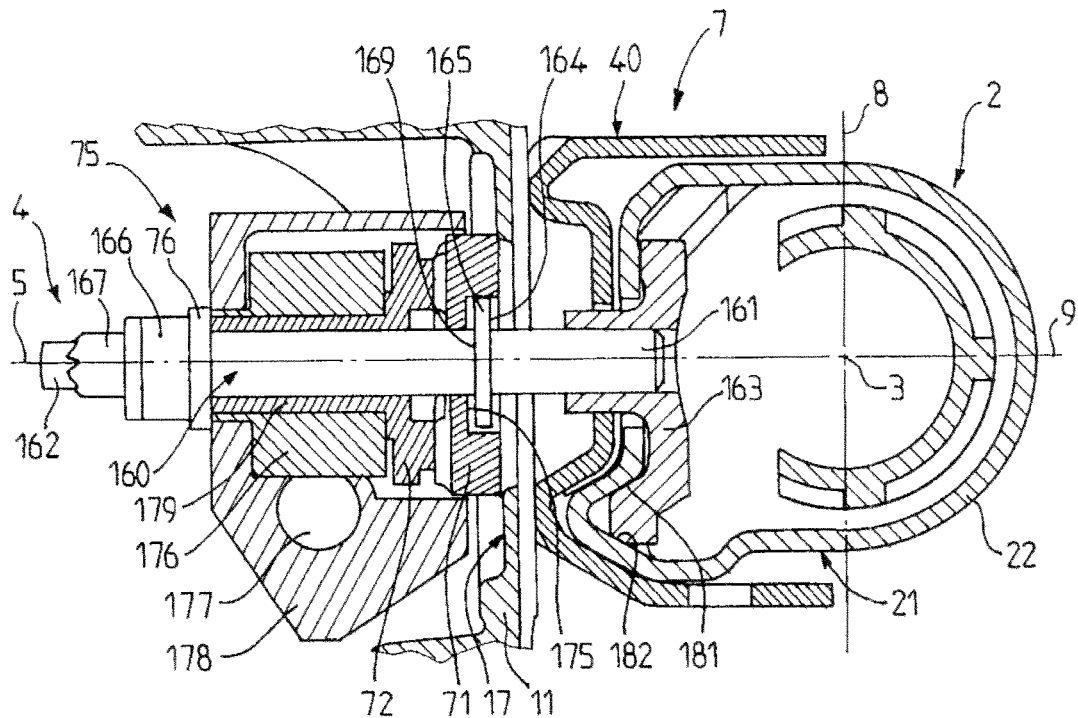
FIG. 9 is a cross-section view through the clamping axis of FIG. 2 in a locked position.
Figure 10:
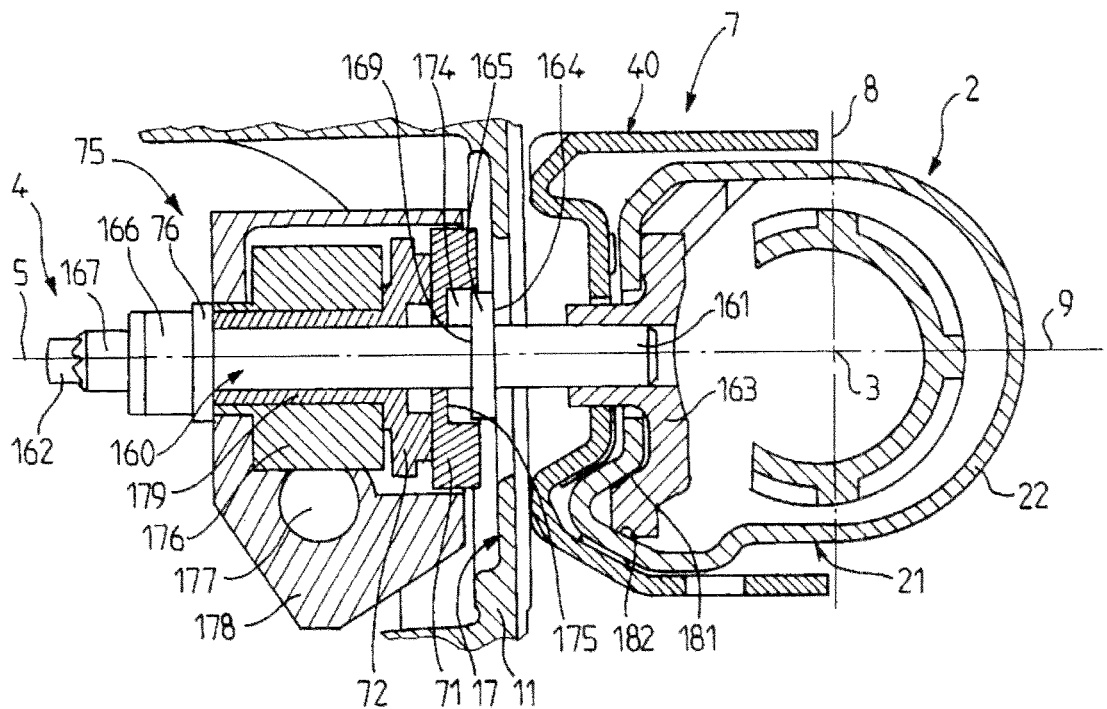
FIG. 10 is a view similar to FIG. 9 in the unlocked position.

A third embodiment of the clamping system 4 is shown on FIGS. 2, 9 and 10.

In these three embodiments, all the other members of the clamping system 4 are mounted on and crossed by the corresponding clamping rod 160, also crossing the tube-body 2 through the crossing oblong hole 28, the bearing member 40 through the crossing hole 49, and the side post 11 through the crossing oblong hole 19.

The other members of the clamping system 4 consist in:
- a clamping assembly 70, being arranged against the external side 17 of the side post 11;
- an operating system 75 rotatingly driving the clamping assembly 70 with respect to the clamping axis 5;
- a needle abutment 76 arranged against the external side of the operating system 75;
- a clamping square having a threaded hole for being mounted on the internal threaded end 161 of the clamping rod 160 in order to make up a clamping head 163, coming against the internal sides 29 and 30 of the tube-body 2;
- a clamping member 166, being provided at the external end of the clamping rod 160 so as to clamp, in the direction of the clamping axis 5, the tube-body 2 on the side post 11 by means of the bearing member 40, when the clamping system 4 is in the locked position.

As has been shown on FIGS. 3, 4, 7 to 10, the clamping square making up the clamping head 163, comprises two tilted sides 181 and 182, being oriented so as to come against respectively the internal sides 29 and 30 of the corresponding tilted portions 23 and 24 of the tube-body 2.

Moreover, the clamping square making, up the clamping head 163 comes against the internal side 31 of the connecting portion 27 on the other side of the internal sides 29 and 30 with respect to the clamping plane 9.

In a first embodiment, the clamping assembly 70 comprises a fixed plate 171, a mobile plate 172 and spherical ended needles 173 arranged between the two plates and abutting on the two plates 171, 172. The fixed plate 171 comes against the external side 17 of the side post 11, and is fixed in rotation with respect to the clamping axis 5. The mobile plate 172 is integral with the operating system 75, and is mobile in rotation with respect to the clamping axis 5.

In a second and a third embodiment, the clamping assembly 70 comprises a fixed cam 71 and a mobile cam 72. The fixed cam 71 comes against the external side 17 of the side post 11, and is fixed in rotation against the clamping axis 5. The mobile cam 72 is integral with the operating system 75, and is mobile in rotation with respect to the clamping axis 5.

In the three embodiments, the operating system 75 could be a manual lever 275, as has been shown on FIGS. 1, 3 to 8. In the three embodiments, the operating system 75 could also be made up of an electric control, as illustrated on FIGS. 2, 9 and 10, said electric control comprising a wheel system 176 and an endless screw 177 being driven by an electric engine 178, said wheel 176 is mounted on a hub 179 it is integral with, the hub 179 belonging to the mobile cam 72 or to the mobile plate 172.

For being implemented, the sliding clearance adjusting system cooperates with the external side 17 of the post 11 and it is arranged and provided on the clamping rod 160.

The sliding clearance adjusting system comprises an adjustment bearing member 165, which may also be referred to as an abutment member, mounted and integrated onto the clamping rod 160, said adjustment bearing member 165 being operable in order to adjust its axial position with respect to the external side 17 of the post 11, so that, in the unlocked position of the clamping system, there is the desired clearance between each one of the two internal bearing sides 47, 48 of the bearing member 40 and the corresponding external contact side 33, 34 of the tube-body 2.

In the embodiment of the clamping system 4 as shown on the figures, the clamping rod 160 has an internal threaded end 161, an external threaded end 162, and a central part with an integrated adjustment hearing member 165, made up of a positioning ring. The internal threaded end 161 receives a clamping nut making up the clamping head 163, the tilted sides 181 and 182 of which cooperate with the internal sides 29 and 30 of the tube-body 2, for enabling the clamping in the locked position. The sliding clearance adjusting system comprises the adjustment bearing member 165 making up the positioning ring and an operating shape 167 arranged at the end of said external threaded end 162.

The shape 167 enables to rotate the clamping rod 160, so as to adjust the distance between the clamping head 163 made up by the clamping nut and the adjustment bearing member 165 made up by the positioning ring, the internal side 164 of which abuts against the external side 17 of the post 11 when the clamping system 4 is in the unlocked position with the desired sliding clearance between the external contact sides 33, 34 and the internal bearing sides 47, 48.

The clamping member is made of a clamping nut 166, moving on the external threaded portion 162 for being clamped against the needle abutment 76, when the clamping system is in the locked position.

Moreover, a spring could be arranged between the adjustment bearing member 165 made up of the positioning ring and the internal side of the clamping assembly 70 and/or the external side of the post 11 so as to completely cancel the operating clearance upon sliding with a controlled position adjustment effort.

Thus, the tube-body 2 is linked to the side post 11 by a lateral mechanism 7, enabling two operating positions: the locked position and the unlocked position. The locked position enables to obtain a link of the embedded type between the side post 11 and the tube-body 2. The unlocked position enables to obtain a controlled clearance between the side post 11 and the tube-body 2. Such a controlled clearance provides for the vertical and axial motion of the tube-body with respect to the side post 11 avoiding any apparent tipping of the steering wheel. Such a clearance is adjusted using the threaded part 161 of the clamping rod 160 of the clamping system 4.

In order to achieve the locked position, latching is achieved by the rotation of the mobile cam 72 or the mobile plate 172 with respect to the fixed cam 71, or the fixed plate 171 generating a positive axial motion of the clamping rod 160. In such a position, the clamping assembly 70, the clamping nut 166, the clamping rod 160, the side post 11, the bearing member 40, the tube-body 2, the clamping head 163 are under constraint according to the clamping axis 5. In such a position, the motion of the tube-body 2 with respect to the side post 11, under an effort compatible with the constraints relative to such a type of product, is not possible. In such a position, there is a clearance between the internal side 164 of the adjustment bearing member 165 made up of the positioning ring and the external side 17 of the post 11; and there is a clearance between the external side 169 of said positioning ring 165 and the bottom 175 of the housing 174, which has a hollow space and may be referred to as a cavity.

In order to reach the unlocked position, unlocking is achieved by the rotation of the mobile cam 72 or the mobile plate 172 with respect to the fixed cam 71, or the fixed plate 171, generating a negative axial motion of the clamping rod 160. In such a position, the clamping assembly 70, the clamping nut 166, the clamping rod 160, the side post 11, the bearing member 40, the tube-body 2, the clamping square 180 are no longer under constraint according to the clamping axis 5. The sliding sides of the side post 11 and of the tube-body 2 then enable to authorize a vertical and axial relative motion of those two parts. In such a position, the clearance between the adjustment bearing member 165 made up of the positioning ring and the external side 17 of the post 11 is compensated for. The adjustment bearing member 165 made up of the positioning ring then makes up the abutment, according to the clamping axis 5, of the tube-body 2, of the bearing member 40, of the clamping square 180, of the clamping rod 160 and of the post 11. The adjustment of the position of the positioning ring enables to release the constraints of the tube-body 2/side post 11 link without inducing any rotation, that is any relative tipping of such members.

The invention claimed is:

1. A device for adjusting in height and/or in depth a position of a steering column of an automotive vehicle relative to a support assembly fixed to a structure of the vehicle, said steering column comprising a steering shaft received in a tube-body for rotation about a steering axis, the support assembly comprising only one side post located on only one side of a vertical plane containing the steering axis, the side post having an internal face facing the vertical plane and an external face facing away from the vertical plane;

said device further comprising a lateral mechanism for clamping the tube-body relative to the side post, the lateral mechanism providing all links between the tube-body and the support assembly, the lateral mechanism being located only on said one side of the vertical plane and comprising:
- a movable clamping rod coaxial with a clamping axis substantially perpendicular to the vertical plane and movable parallel to the clamping axis;
- an abutment member fixed relative to the clamping rod;
- a clamping head, mounted on the clamping rod, the clamping head being arranged inside the tube-body, the clamping head being axially adjustable with respect to the clamping rod so as to adjust an axial distance between the abutment member and the clamping head and obtain a desired sliding clearance;
- an adjustable clamping member mounted on the clamping rod, the clamping member being arranged outside the external face of the side post, the clamping member being axially adjustable with respect to the clamping rod; and
- a clamping assembly comprising a fixed clamping cam or plate bearing against the external face of the side post and provided with a cavity facing the external face of the side post, the abutment member being received within said cavity, and a rotatable clamping cam or plate bearing against the adjustable clamping member and rotating about the clamping axis between a locked position and an unlocked position, wherein rotation of the rotatable clamping cam or plate towards the locked position results in axial motion of the rotatable clamping cam or plate, the adjustable clamping member, and the clamping rod away from the steering column to clamp the tube-body against the internal face of the side post and wherein rotation of the rotatable clamping cam or plate towards the unlocked position result in the clamping rod being released and free to move, and wherein motion of the clamping rod in the unlocked position being limited by abutment of the abutment member against the external face of the side post; and
- wherein the abutment member is fixed relative to the clamping rod when the clamping assembly is in the locked position and the unlocked position.

2. The device according to claim 1, wherein:
the clamping rod comprises an integrated ring making up the abutment member;
the clamping rod has an internal threaded end being engaged into a threaded hole of the clamping bracket;
the clamping rod has an external threaded end with an operating shape arranged at a very end, said shape enabling the adjustment of the clamping head with respect to the abutment member in unlocked position;
the external threaded end receives the clamping member consisting in a clamping nut clamped in locked position.

3. The device according to claim 1, wherein the clamping mechanism further comprises a bearing member cooperating with the tube-body, said bearing member having a cross-section profile with respect to the steering axis cooperating with a conjugated profile being provided on said tube-body, the bearing member being arranged between the tube-body and the side post, and the bearing member being connected to said side post.

4. The device according to claim 3, wherein the clamping system comprises:
a driving system for rotatably driving the clamping assembly with respect to the clamping axis;
wherein the clamping head is a clamping bracket having a threaded hole for being mounted on an internal threaded end of the clamping rod and bears against internal sides of the tube-body; and
wherein the clamping member is provided at an external end of the clamping rod so as to clamp, in the direction of the clamping axis, the tube-body on the side post when the clamping system is in the locked position.

5. The device according to claim 3, wherein the bearing member comprises two internal bearing sides being tilted one with respect to the other, being parallel to the steering axis, and being arranged on one side of a clamping plane containing the clamping axis and the steering axis, said internal bearing sides cooperating respectively with two external contact sides having a conjugated profile, being provided on the tube-body, said external contact sides having the same tilt with respect to the vertical plane as said internal bearing sides, and being parallel to said steering axis.

6. The device according to claim 5, wherein the clamping system comprises:
a driving system for rotatably driving the clamping assembly with respect to the clamping axis;
wherein the clamping head is a clamping bracket having a threaded hole for being mounted on an internal threaded end of the clamping rod and bears against internal sides of the tube-body; and
wherein the clamping member is provided at an external end of the clamping rod so as to clamp, in the direction of the clamping axis, the tube-body on the side post when the clamping system is in the locked position.

7. The device according to claim 6, wherein:
the fixed clamping cam or plate is a plate fixed in rotation with respect to the clamping axis, the rotatable clamping cam or plate is a plate mobile in rotation with respect to the clamping axis integral with the driving system, wherein the clamping assembly further comprises spherical ended needles abutting between and against the fixed and mobile plates;
so that, in the unlocked position of the clamping system, there is the desired clearance between each one of the two internal bearing sides of the bearing member and the respective external contact sides of the tube-body.

8. The device according to claim 6, wherein:
the fixed clamping cam or plate is a cam fixed in rotation with respect to the clamping axis, and the rotatable clamping cam or plate is a cam mobile in rotation with respect to the clamping axis and integral with the driving system;
so that, in the unlocked position of the clamping system, there is the desired clearance between each one of the two internal bearing sides of the bearing member and the corresponding external contact side of the tube-body.

9. The device according to any of claims 7 and 8, wherein the driving system is a manual lever.

10. The device according to any of claims 7 and 8, wherein the driving system is an electric control comprising a wheel system and an endless screw driven by an electric engine.

11. The device according to any of claims 7 and 8, wherein:
the tube-body comprises a side member comprising two tilted portions being connected to a substantially vertical connecting portion, each tilted portion comprises an external side being one of the respective contact sides, and the connecting portion is provided with an oblong hole parallel to the steering axis and through which the clamping rod passes;
the bearing member comprises two substantially vertical bearing portions coming against the side post with a vertical connecting portion having two tilted portions which comprises two internal sides being the bearing sides, said connecting portion having a hole through which the clamping rod passes;

the side post comprises an oblong hole substantially perpendicular to the clamping plane and through which the clamping rod passes;

the clamping bracket has two tilted sides coming against the internal sides of the tilted portions of the tube-body;

so as to enable the clamping in the locked position.

12. An automotive vehicle comprising a vehicle structure, a support assembly fixed to the vehicle structure, a steering column and a device for adjusting in height and/or in depth a position of the steering column relative to the support assembly, said steering column comprising a steering shaft received in a tube-body for rotation about a steering axis, the support assembly comprising only one side post located on only one side of a vertical plane including the steering axis, the side post having an internal face facing the vertical plane and an external face facing away from the vertical plane, said device further comprising a lateral mechanism located only on said one side of the vertical plane for clamping the tube-body relative to the side post, the lateral mechanism comprising:

a clamping rod coaxial with a clamping axis substantially perpendicular to the vertical plane;

an abutment member fixed relative to the clamping rod;

a clamping head, mounted on the clamping rod, the clamping head being arranged inside the tube-body, the clamping head being axially adjustable with respect to the clamping rod so as to adjust an axial distance between the abutment member and the clamping head and obtain a desired sliding clearance;

an adjustable clamping member mounted on the clamping rod, the clamping member being arranged outside the external face of the side post, the clamping member being axially adjustable with respect to the clamping rod;

a clamping assembly comprising a fixed clamping cam or plate bearing against the external face of the side post and provided with a cavity facing the external face of the side post, the abutment member being received within said cavity, and a rotatable clamping cam or plate bearing against the adjustable clamping member and rotating about the clamping axis between a locked position and an unlocked position, wherein rotation of the rotatable clamping cam or plate towards the locked position results in axial motion of the rotatable clamping cam or plate, adjustable clamping member, and clamping rod away from the steering column to clamp the tube-body against the internal face of the side post and wherein rotation of the rotatable clamping cam or plate towards the unlocked position result in the clamping rod being released and free to move, motion of the clamping rod in the unlocked position being limited by abutment of the abutment member against the external face of the side post; and wherein the abutment member is fixed relative to the clamping rod when the clamping assembly is in the locked position and the unlocked position.

13. An automotive vehicle comprising a vehicle structure, a support assembly fixed to the vehicle structure, a steering column and a device for adjusting in height and/or in depth a position of the steering column relative to the support assembly, said steering column comprising a steering shaft received in a tube-body for rotation about a steering axis, the support assembly comprising a side post located on one side of a vertical plane including the steering axis, the side post having an internal face facing the vertical plane and an external face facing away from the vertical plane, said device further comprising a lateral mechanism for clamping the tube-body relative to the side post, the lateral mechanism comprising:

a clamping rod coaxial with a clamping axis substantially perpendicular to the vertical plane;

an abutment member fixed relative to the clamping rod in a locked position and an unlocked position;

a clamping head, mounted on the clamping rod, the clamping head being arranged inside the tube-body and being axially adjustable with respect to the clamping rod so as to adjust an axial distance between the abutment member and the clamping head to obtain a desired sliding clearance;

an adjustable clamping member mounted on the clamping rod, the clamping member being arranged outside the external face of the side post and being axially adjustable with respect to the clamping rod;

a clamping assembly comprising a fixed clamping plate and a rotatable clamping plate, said fixed clamping plate bearing against the external face of the side post and provided with a cavity facing the external face of the side post and having the abutment member received within said cavity, said rotatable clamping plate bearing against the adjustable clamping member and rotating about the clamping axis between the locked position and the unlocked position;

wherein rotation of the rotatable clamping plate towards the locked position results in axial motion of the rotatable clamping plate, adjustable clamping member, and clamping rod away from the steering column to clamp the tube-body against the internal face of the side post; and wherein rotation of the rotatable clamping plate towards the unlocked position result in the clamping rod being released and free to move, motion of the clamping rod in the unlocked position being limited by abutment of the abutment member against the external face of the side post.

* * * * *